(12) United States Patent
Tanner

(10) Patent No.: US 8,967,360 B2
(45) Date of Patent: Mar. 3, 2015

(54) CONVEYING DEVICE FOR CYLINDRICAL MEMBERS, COMPRISING RUNNING RAILS INCLINED IN THE DIRECTION OF TRAVEL

(75) Inventor: Marcel Tanner, Bassersdorf (CH)

(73) Assignee: M. Tanner AG, Iinau (CH)

( * ) Notice: Subject to any disclaimer, the term of this patent is extended or adjusted under 35 U.S.C. 154(b) by 0 days.

(21) Appl. No.: 13/981,491

(22) PCT Filed: Jan. 24, 2012

(86) PCT No.: PCT/CH2012/000016
§ 371 (c)(1),
(2), (4) Date: Aug. 24, 2013

(87) PCT Pub. No.: WO2012/100357
PCT Pub. Date: Aug. 2, 2012

(65) Prior Publication Data
US 2013/0327611 A1 Dec. 12, 2013

(30) Foreign Application Priority Data
Jan. 28, 2011 (CH) .......................................... 158/11

(51) Int. Cl.
*B65G 11/02* (2006.01)
*B65G 21/20* (2006.01)
*B29C 49/06* (2006.01)
*B29C 49/42* (2006.01)

(52) U.S. Cl.
CPC .......... *B65G 11/023* (2013.01); *B65G 21/2063* (2013.01); *B65G 2201/0235* (2013.01); *B29C 49/06* (2013.01); *B29C 49/4205* (2013.01)
USPC ................ 193/41; 193/2 R; 193/38; 198/389; 198/466.1; 198/836.1

(58) Field of Classification Search
USPC .......... 193/2 R, 38, 41; 198/389, 466.1, 624, 198/663, 836.1, 836.2
See application file for complete search history.

(56) References Cited

U.S. PATENT DOCUMENTS 4,694,951 A * 9/1987 Gibbemeyer .............. 198/468.3
6,024,518 A * 2/2000 Ouellette ........................ 406/88
(Continued)

FOREIGN PATENT DOCUMENTS

| DE | 20 2006 012914 | 12/2007 |
| DE | 10 2009 016593 | 10/2010 |
| WO | WO 2007/028627 | 3/2007 |

OTHER PUBLICATIONS

PCT/CH2012/000016 Search Report.
(Continued)

*Primary Examiner* — Leslie A Nicholson, III
*Assistant Examiner* — Keith R Campbell
(74) *Attorney, Agent, or Firm* — Notaro, Michalos & Zaccaria P.C.

(57) ABSTRACT

A conveying device for cylindrical members, such as parisons (1) for hollow objects, has running rails (8, 9) which are inclined in the direction of travel of the parisons (1). A neck (3) of the parisons (1) which is part of a head (2) lies on the running rails (8, 9). A guide rail (11) which is located at a certain distance from the head (2) of the parisons (1) is fixedly arranged above the running rails (8, 9). A movable intermediate element (12) is retained and guided within the running rail (11). A force component (16) directed against the head (2) of the parisons (1) acts on the intermediate element (12).

11 Claims, 4 Drawing Sheets

(56) References Cited

U.S. PATENT DOCUMENTS

Figure 1:
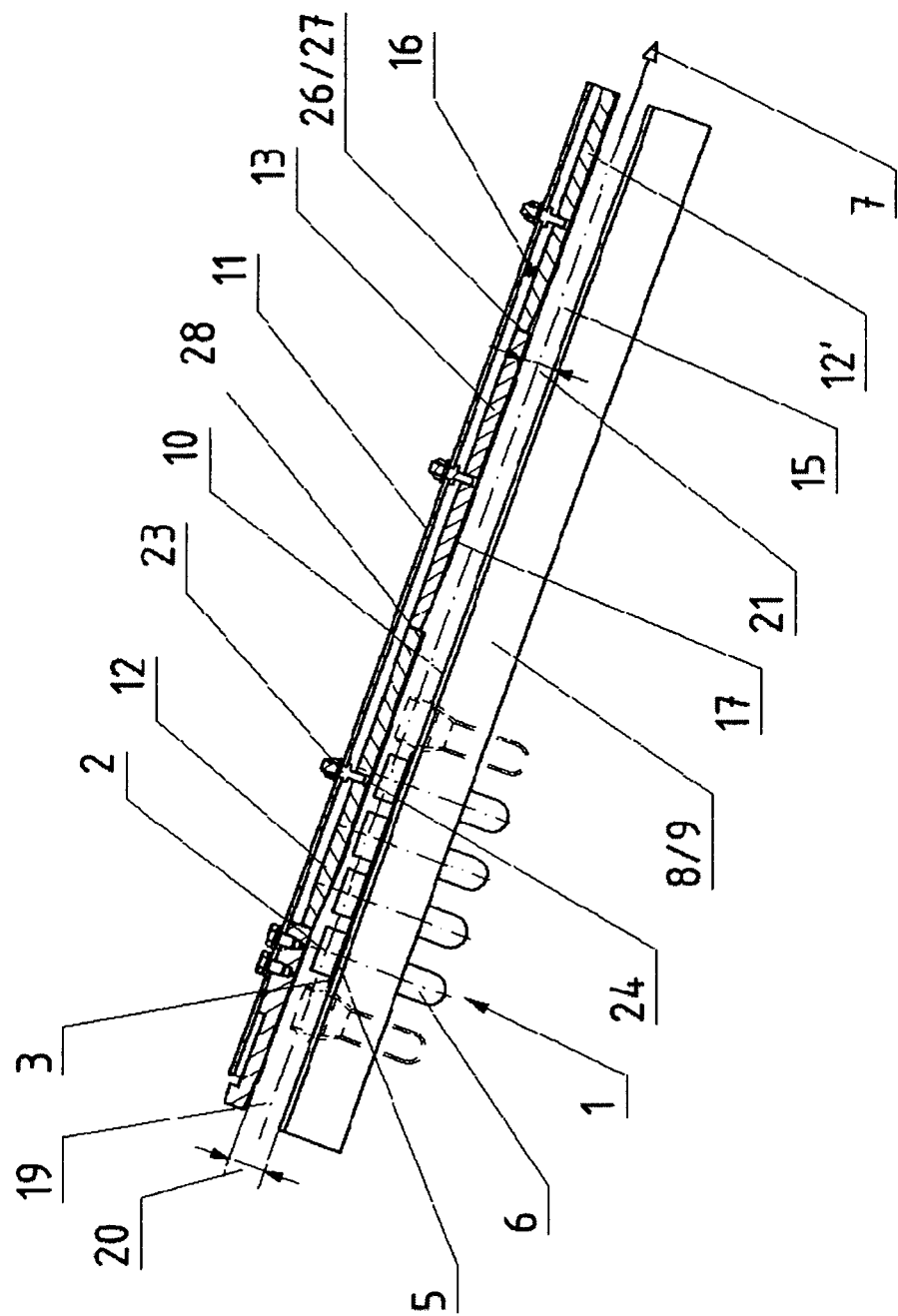

| | | | | |
|---|---|---|---|---|
| 6,488,449 B1* | 12/2002 | Laquay et al. | ................... | 406/88 |
| 6,575,305 B1* | 6/2003 | Casagrande | ................... | 209/616 |
| 7,837,029 B2* | 11/2010 | Russell | ................... | 198/851 |
| 8,337,193 B2* | 12/2012 | Brown | ................... | 425/534 |
| 8,490,797 B2* | 7/2013 | Tanner | ................... | 209/658 |
| 8,522,956 B2* | 9/2013 | Tanner | ................... | 198/395 |
| 8,657,099 B2* | 2/2014 | Bianchini | ................... | 198/417 |
| 2012/0312661 A1* | 12/2012 | Bianchini | ................... | 198/604 |
| 2014/0151189 A1* | 6/2014 | Novak | ................... | 198/443 |

OTHER PUBLICATIONS

PCT/CH2012/000016 Preliminary Report.

\* cited by examiner

CONVEYING DEVICE FOR CYLINDRICAL MEMBERS, COMPRISING RUNNING RAILS INCLINED IN THE DIRECTION OF TRAVEL

Conveying device for cylindrical members, such as parisons for hollow objects, on a transporting route, the parisons having at least one head with a collar, the conveying device comprising two running rails, which extend parallel to one another and are located at a spacing from one another and are inclined in the direction of travel, said running rails having upward-facing surfaces which form a sliding and supporting surface for a lower surface of the collars of the parisons, and a guide rail being fixedly located above and at a spacing from the sliding and supporting surfaces of the two running rails, said guide rail forming a height guide for the head of the parisons.

Usually, cylindrical members, such as parisons for PET bottles, also known as preforms, are supplied in an unsorted state as piece goods in large containers and fed via a charging unit to a separating unit. The separating unit sets the parisons upright and forms a single line of parisons, which exits the separating unit, for example, via a sliding rail guide, also known as running rails, which is inclined in the direction of travel or directed obliquely downward. On account of gravity, the parisons slide downward on said running rails. From there, the parisons reach testing units and conveying devices and, finally, a stretch blow molding machine, where their cylindrical member is blown to a desired container shape or bottle shape. A conveying device inclined in the direction of travel, and having what are known as running rails, is also often located between the testing unit and the stretch blow molding machine.

Depending on the end product, i.e. the shape and volume of the hollow object to be produced, for example a bottle, the parisons are of various shapes and sizes. At an upper, open end, the parisons typically have a head with a threaded connection and a collar or carrying ring, said head having a larger diameter than the remaining, lower part. In order for the parisons to be transported or conveyed in a trouble-free manner by means of conveying devices, for example with the aid of inclined running rails, the dimensions of the head, the shape of the member, but also the weight and the location of the center of gravity play a substantial role. For cost reasons, but also in order to save raw materials, there is a tendency to configure the hollow objects formed from the parisons, in particular bottles, with relatively thin walls and also to reduce the size, and reconfigure the head parts. On account of this, the parisons become smaller and lighter, and the shape and weight ratios between the upper head part and the lower part of the parisons change in comparison to the parisons used to date. This results in more malfunctions occurring in the conveying devices having inclined running rails used to date, and the transporting operation of the parisons through the production installation is thus disrupted and repeatedly interrupted. Production losses and increased maintenance costs are the result of this.

In conveying devices having two running rails which extend parallel to one another and are located at a spacing from one another and are inclined in the direction of travel, the parisons slide from the upper end to the lower end of the running rails by the effect of gravity. The parisons here bear with their collar on the running rails, and the lower part hangs between the running rails. In the event that the unit which follows the running rails receives the parisons intermittently, i.e. not in a uniform manner, interruptions in the sequence of this sliding movement occur and the parisons strike against one another. Already with the known parisons which have been customary to date, this resulted in it being possible for these to tilt or be lifted off the running rails. To avoid such malfunctions, it was already proposed in the context of known production installations and their conveying devices having running rails to locate a rigid guide rail above and at a spacing from the running rails, said guide rail acting as a height guide for the parisons. This guide rail is at a small spacing from the upper end of the head of the parisons hanging in the running rails, on account of which it was possible to reduce the number of malfunctions with the parisons which have been customary to date. However, in the event of the newly introduced, lighter and smaller parisons being conveyed and transported in such an arrangement, frequent malfunctions occur anew, in fact to an extent which is not acceptable. The lighter parisons here jam between the running rails and the guide rail, and their own weight is too small to return them automatically to their normal transporting position. This interrupts the flow of parisons, and the entire installation is brought to a standstill. Attempts have also been made to remedy the malfunctions by vibrating the running rails, but this led to other malfunctions and did not bring about sufficient success. The jammed parisons need to be released manually, which, aside from the production stoppage, involves much outlay.

It is thus an object of the invention to provide a conveying device having inclined running rails and with which even parisons which cause the above-described malfunctions, these parisons being intended for lighter and/or smaller hollow objects, in particular plastic bottles, can be conveyed and transported, the number of malfunctions or interruptions in transportation being reduced to a minimum in the process.

This object is achieved according to the invention in conjunction with the preamble of claim 1 in that at least one movable intermediate element is guided in said guide rail, said intermediate element is movable approximately at right angles in relation to the sliding and supporting surfaces of the running rails, and a part-region of said intermediate element protrudes into the intermediate space between the sliding and supporting surfaces of the running rails and the guide rail, and forms a guide element for the head of the parisons, and in that an element of force having a force component, which is directed toward the intermediate space, acts on the intermediate element.

This device according to the invention reliably prevents the parisons from jamming and/or lodging between the running rails and the intermediate element installed in the guide rail. The number of malfunctions or interruptions in transportation is minimized when using this device. Parisons which are lifted or tilt in relation to the supporting surfaces of the running rails can raise the intermediate element counter to the component of force acting on said intermediate element, and they are also pushed back into the normal transporting position by said component of force. On account of this return force and the movement of the adjacent parisons, the parisons are reintegrated into the transporting line, and a malfunction is avoided.

An advantageous embodiment of the subject matter of the invention provides that the element of force which generates the force component is gravity and/or a spring element. It has surprisingly been demonstrated that gravity, which, in the case of inclined running rails, acts on the movable intermediate element in the rigid guide rail, suffices to cause the advantageous effect according to the invention. By means of the weight and the shape of the movable intermediate element, the component of force which results from gravity, and pushes the intermediate element in the direction of the supporting surfaces of the running rails, can be adapted to requirements. The force acting via the component of force here is chosen such that the intermediate element can easily be raised by incorrect movements of a parison, but, at the same time and subsequently, said parison is pushed back again into the normal position by sufficient force. Should gravity not suffice to generate the desired component of force, additionally one or more spring elements may be provided, which generate an additional component of force which is directed toward the supporting surfaces of the running rails and acts on the intermediate element.

A further embodiment of the invention provides that the spacing between the sliding and supporting surfaces of the running rails and a sliding surface on the intermediate element, said sliding surface being directed toward the running rails, is at least 0.1 mm larger than the height of the head of the parisons between the lower surface of the collar and an upper end surface of the head. This arrangement ensures that normally no additional friction forces are exerted on the parisons in the transporting line. Moreover, slight positional deviations of the parisons, said positional deviations also not causing any malfunctions in the transporting sequence, do not result in contact with the movable intermediate element in the guide rail.

According to the invention it is further proposed that, in an initial position of the intermediate element, the free spacing between the sliding and supporting surfaces of the running rails and the guide rail is 1 mm larger than the spacing between the sliding and supporting surfaces and a sliding surface on the intermediate element, said sliding surface being directed toward the running rails. The advantage of this arrangement is that it is ensured that the head of the parisons, in the event of any incorrect movement, always touches the movable intermediate element and not the rigid guide rail. The intermediate element is in the initial position when there is no contact, with any head of a parison, which would raise the intermediate element.

A further expedient embodiment of the subject matter of the invention provides that one or more intermediate elements extends or extend over the entire length of the guide rail. In the case of short configurations of running rails, the guide rail, which is located above the running rails, may have a single intermediate element. This then extends substantially over the entire guide rail, end pieces potentially being located at both end regions of the guide rail. In the case of relatively long running rails having a correspondingly long guide rail, it is expedient to arrange a plurality of successive intermediate elements. Their length here may be adapted to the properties of the parisons being transported and the geometrical shape of the running rails, i.e. of the conveying device. If required, the rigid guide rail may additionally also be subdivided in the direction of travel.

According to the invention it is further proposed that at least one guide pin is located on the guide rail, and at least one guide bore or one guide groove is located on each intermediate element, said guide pin and guide bore or guide groove interacting and positioning the intermediate element in the direction of travel. Since the running rails and the associated guide rail are inclined in the direction of travel, the movable intermediate elements also slide toward the lower end of the running rails. This solution according to the invention prevents this sliding movement of the intermediate elements toward the lower end and defines the position of the intermediate elements in relation to the guide rail. If only one intermediate element is provided, this arrangement prevents the situation where the lower end face of the intermediate element lies against a lower end piece of the guide rail and can jam as a result. If a plurality of successive intermediate elements is provided, this arrangement can be used to define the position of each individual intermediate element and to set a spacing between the adjacent end surfaces of the intermediate elements. In a further expedient embodiment of the subject matter of the invention it is thus also proposed that the end surfaces of each intermediate element are located at a spacing of at least 0.2 mm, preferably 0.5 mm, from adjacent elements, as seen in the direction of travel. On account of this, individual intermediate elements can me moved at one end without touching the adjacent element as a result of the oblique positioning. Their movement sequence is thus not compromised. In order to ensure the free movement sequence of the intermediate elements, a corresponding allowance for clearance for movement is also provided between the guide pins and the guide bores or guide grooves located on each intermediate element.

Preferably, friction-reducing elements are located on the end surfaces of each intermediate element, as seen in the direction of travel. Suitable friction-reducing elements are, for example, coatings of materials having particularly good sliding properties. It is, however, also possible to locate rolling components, for example a ball, between two adjacent end surfaces of intermediate elements, and to provide corresponding rolling tracks in the end surfaces.

A further preferred embodiment of the invention provides that the cross section of the guide rail is C-shaped and the cross section of the intermediate element is T-shaped. Here, the head part of the T-shaped intermediate element is held and guided in the C-shape of the guide rail. The intermediate element here can move only approximately at right angles in relation to the sliding and supporting surfaces of the running rails, and movements which are transverse in relation to the direction of travel are prevented. A further advantageous embodiment provides that the cross section of the guide rail is U-shaped and the cross section of the intermediate element is circular or rectangular. In these embodiments the intermediate element is held and guided between the legs of the U-shaped guide rails. Here too, the intermediate element can move only approximately at right angles in relation to the sliding and supporting surfaces of the running rails, and movements which are transverse in relation to the direction of travel are prevented. In this solution, the guide pins on the guide rails may have additional design features for the purpose of holding the intermediate element.

The apparatuses described above are suitable for transporting, in principle, not only parisons but also other piece goods which have a collar or supporting surfaces and are conveyed in a similar manner in a line along the conveying device.

Figure 2:
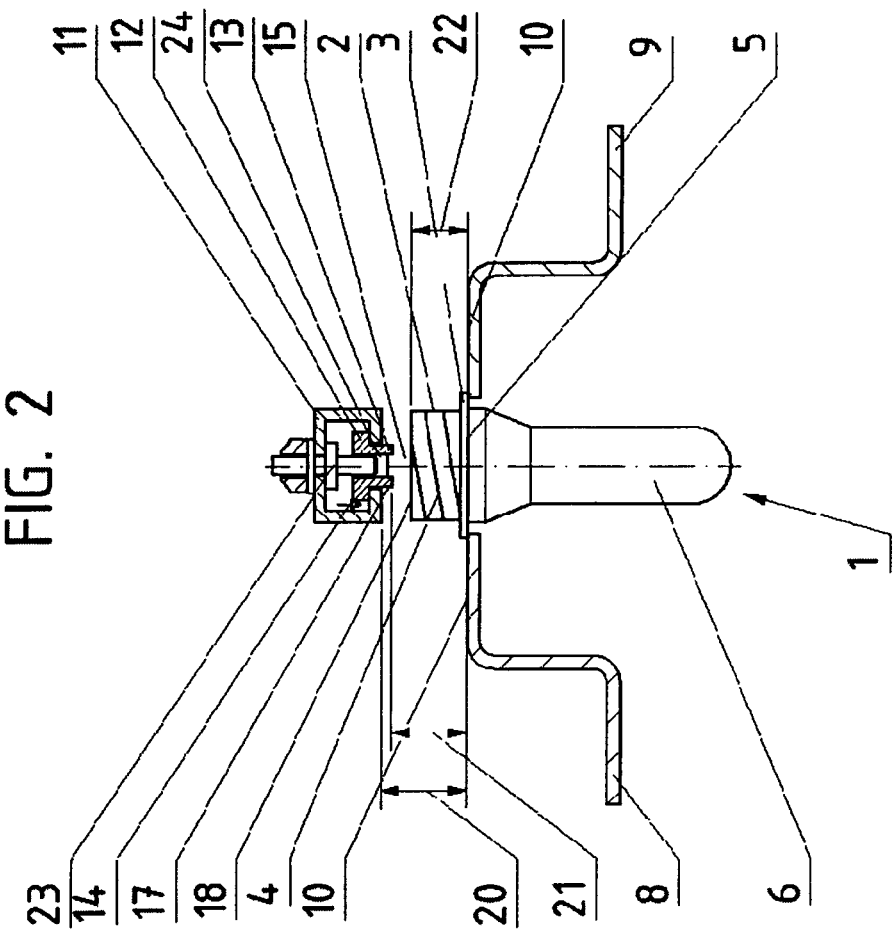
Figure 3:
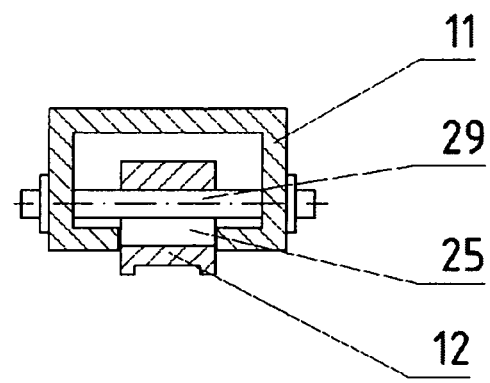
Figure 4:
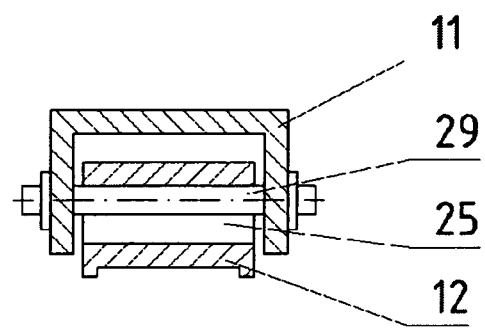
Figure 5:
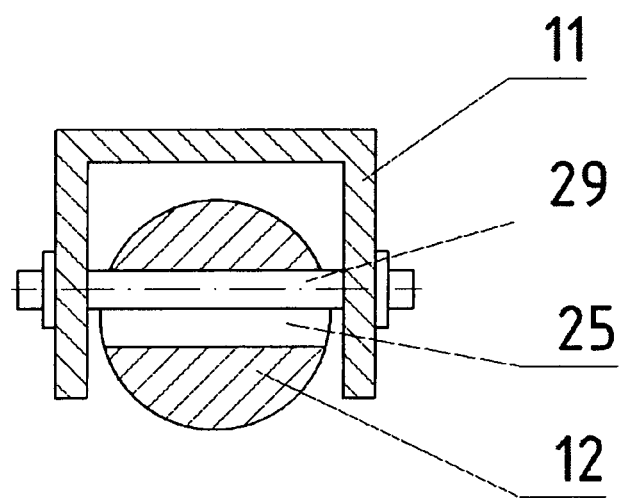
Figure 6:
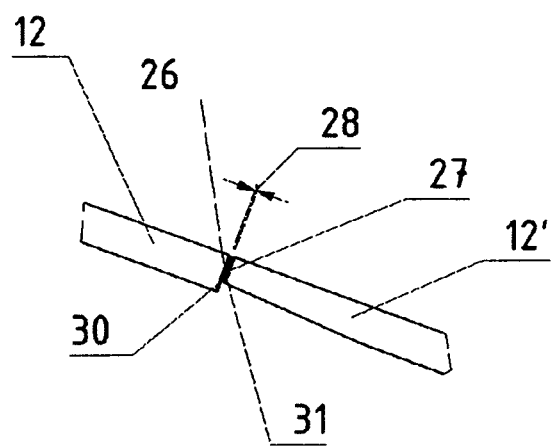

In the following, the invention is explained in more detail by means of exemplary embodiments and with reference to the attached drawings, in which, in schematic illustrations:

FIG. 1 shows a longitudinal section through a part of a conveying device according to the invention having running rails, FIG. 2 shows a cross section through the conveying device according to FIG. 1, FIG. 3 shows a first alternative cross section of guide rails and intermediate element, FIG. 4 shows a second alternative cross section of guide rails and intermediate element, FIG. 5 shows a third alternative cross section of guide rails and intermediate element, and FIG. 6 shows the end regions of adjacent intermediate elements.

FIG. 1 shows a schematic illustration of a longitudinal section through an upper start region of a conveying device according to the invention, having two running rails 8, 9. The two running rails 8, 9 are located at a spacing from, and parallel to, one another, as seen perpendicularly to the image plane, only one of the two running rails 8, 9 being visible. The upward-facing surfaces of the two running rails 8, 9 here form sliding and supporting surfaces 10. Parisons 1 are guided between the two running rails 8, 9, said parisons being arranged in a line and conveyed in the direction of the arrow 7 through the conveying device. In the example described, the parisons are made from plastic and are intended for PET bottles. These parisons 1 have a head 2, which comprises a collar 3 and a part having a thread 4 (see FIG. 2), and a lower part 6. A lower surface 5 of the collar 3 of the parisons 1 here bears on the supporting surfaces 10 of the running rails 8, 9. The two running rails 8, 9 are inclined in the direction of travel 7 and form an angle of inclination in relation to a horizontal plane. This angle of inclination here is chosen such that the parisons 1 slide over the running rails 8, 9 at sufficient speed in the direction of travel 7 from top left to bottom right by the effect of gravity. In the example illustrated, this angle of inclination is about 20°. A testing unit (not illustrated) or a separating unit or a curve for changing direction etc. for the parisons 1 may be located upstream of the upper start region 13 of the conveying device, the parisons 1 being transferred therefrom in a known manner to the running rails 8, 9. The lower end region of the conveying device is not illustrated, but is followed by a receiving unit, for example a turntable or a testing unit or a curve for changing direction etc., which transfers the parisons 1 to a blow molding machine.

A guide rail 11 is rigidly or fixedly located at a spacing 20 above the sliding and supporting surfaces 10 of the two running rails 8, 9. At least one movable intermediate element 12 is located in this guide rail 11. In the example shown, a plurality of additional intermediate elements 12' are provided, all the elements 12, 12' being lined up one beside the other in the direction of travel 7. These intermediate elements 12, 12' are movable approximately at right angles in relation to the sliding and supporting surfaces 10 of the running rails 8, 9. In a normal position or in the initial position, as illustrated in FIG. 2, a part-region 13 of these intermediate elements 12, 12' protrudes into the intermediate space between the running rails 8, 9 and the guide rail 11. Therefore, the spacing 21 between the sliding and supporting surfaces 10 and a lower sliding surface 17 on the intermediate elements 12, 12' is smaller than the spacing 20 between the running rails 8, 9 and the guide rail 11. This spacing 21, however, is at least 0.1 mm larger than the height 22 of the head 2 of the parisons 1. This ensures that, during normal, undisrupted passage of the parisons 1 through the conveying device, no direct contact occurs between the head 2 of the parisons 1 and the intermediate elements 12, 12', and the parisons 1 are not slowed by additional friction. As soon as a parison 1 is raised or positioned obliquely, the head 2 touches the intermediate element 12, 12' and displaces the same upward from the normal position or initial position.

One guide pin 23 for each intermediate element 12, 12' is located on the guide rail 11, said guide pin 23 engaging in a guide bore 24 in the intermediate elements 12, 12'. Sufficient play is provided between the guide pin 23 and the guide bore 24, such that the intermediate elements 12, 12' can move free of encumbrance. With the aid of these guide pins 23, the movable intermediate elements 12, 12' are positioned in relation to the guide rail 11, and they are prevented from sliding downward in the direction of the incline of the transporting device. Also prevented, furthermore, is the situation where a lower end surface 26 of the intermediate elements 12, 12' can lie against a terminating surface (not illustrated) of the guide rail 11 and, jam in relation to the same, or where the movements at right angles in relation to the sliding and supporting surfaces 10 are compromised. The guide pins 23 interacting with the bores 24, however, also make it possible for the movable intermediate elements 12, 12' to be positioned such that, between adjacent intermediate elements 12, 12', for example the lower end surface 26 of the intermediate element 12 has an intermediate space 28 in relation to the upper end surface of the intermediate element 12'. This prevents contact between the end surfaces 26, 27 and enables the intermediate elements 12, 12' to move free of encumbrance.

FIG. 2 shows a cross section through the conveying device according to the invention as per FIG. 1, specifically in the region of a guide pin 23. It shows the running rails 8, 9, having the sliding and supporting surfaces 10, and a parison 1, which is located in the intermediate space between the two running rails 8, 9. The parison 1 bears on the sliding surfaces 10 with the lower surface 5 of the collar 3. The guide rail 11, having a C-shaped cross section in the example illustrated, is fixedly located at the spacing 20 above the running rails 8, 9. The movable intermediate element 12, which is configured with a T-shaped cross section in the example illustrated, is inserted into the guide rail 11. The intermediate element 12 is held and guided by its upper, wide part in the guide rail 11. The lower part-region 13 of the intermediate element 12 protrudes into the intermediate space 15 having the spacing 20 between guide rail 11 and running rails 8, 9 and is at a spacing 21 from the sliding and supporting surfaces 10. This spacing 21 is at least 0.1 mm, in the example illustrated 2 mm, larger than the height 22 of the head 2. The movable intermediate element 12 is in this position, having the spacing 21, when it is not deflected or not raised by the head 2 of a parison 1. A guide pin 23 is fastened on the guide rail 11, said guide pin 23 engaging in a guide bore 24 on the intermediate element 12. Guide pin 23 and guide bore 24 interact and serve to position and guide the movable intermediate element 12, as described with reference to FIG. 1.

According to the invention, the described conveying device has the advantage that it is less prone to malfunctioning and returns parisons 1 which are deflected from their normal position during the conveying operation back into the normal position without blocking the passage of the parisons 1. Deflections of the parisons 1 from the normal position illustrated in FIGS. 1 and 2 can occur, for example, when the parisons 1 are received not continuously, but intermittently, at the lower exit end of the conveying device. On account of this, short interruptions repeatedly occur in the progression of the parisons 1 in the direction of travel 7, by which the parisons 1 strike against one another and can thus be raised or positioned obliquely. As soon as this occurs, their head 2 or the upper end surface 18 thereof strikes against the lower sliding surface 17 on the movable intermediate elements 12, 12' and can raise said intermediate elements 12, 12'. In contrast to the rigid devices known to date, the parisons 1 are not clamped in during this operation, and the conveying operation is not stopped as a result. On account of the continuation of the conveying movement in the direction of travel 7 and as a result of a component of force 14 which acts on the intermediate elements 12, 12', the deflected parisons are returned back into the normal positions. As a result, the conveying operation can continue unencumbered, and no interruptions and thus no stoppages of the production installation occur. The component of force 14 acts approximately at right angles in relation to the sliding and supporting surfaces 10 and is normally caused by gravity acting on the movable intermediate elements 12, 12'. If this component of force 14 caused by gravity does not suffice, a spring element 16 may be additionally installed, as is illustrated in FIG. 1 with reference to the intermediate element 12'.

FIG. 3 shows an alternative combination of cross-sectional shapes of the guide rail 11 and the movable intermediate element 12. In this embodiment, the intermediate element 12 has a rectangular cross section. In this embodiment, a guide pin 29 is located transversely to the direction of movement of the intermediate element 12 and interacts with a guide groove 25 in the intermediate element 12. All the other components are configured in the same way, and have the same functions, as those described with reference to FIGS. 1 and 2.

FIG. 4 shows a further alternative combination of cross sectional shapes of the guide rail 11 and the intermediate element 12. In this possible solution, the guide rail has a U-shaped cross section, and the cross section of the movable intermediate element 12 is rectangular. The positioning of the rectangular intermediate element 12 in relation to the guide rail 11 in the direction of travel 7 can be solved here also by the combination of guide pin/guide groove 29/25 shown with reference to FIG. 3. In this solution, too, the other components are configured in the same way, and have the same functions, as those described with reference to FIGS. 1 and 2.

FIG. 5 shows an alternative combination of cross sectional shapes, the guide rail 11 also having a U-shaped cross section and the movable intermediate element 12 being configured with a circular cross section. The positioning of the circular intermediate element 12 in relation to the guide rail 11 in the direction of travel 7 can be solved here also by the combination of guide pin/guide groove 29/25 shown with reference to FIG. 3.

FIG. 6 shows an enlarged illustration of the end regions of adjacent intermediate elements 12, 12'. From this illustration it is evident that the adjacent intermediate elements 12, 12' have an intermediate space 28 in relation to one another. This intermediate space 28 measures at least 0.2 mm. In the example illustrated, 0.5 mm are provided. The two end surfaces 26, 27 of the two intermediate elements 12, 12' are coated with sliding plates 30, 31. These sliding plates consist of a material having particularly good sliding properties, e.g. Teflon or a chromium compound. It may also be expedient to provide the entire movable intermediate elements 12, 12' with a coating and/or a surface finish, e.g. chromium, chromium compounds, anodization, hard anodization, or suitable plastic coatings.

Possible materials to use for the movable intermediate elements 12, 12' and the guide rail 11 are, in particular, steel or steel compounds; it is, however, also possible to use aluminum or aluminum compounds and plastics and combinations of these different materials.

The invention claimed is:

1. A conveying device for cylindrical members (1) for hollow objects, on a transporting route, the cylindrical members (1) having at least one head (2) with a collar (3), the conveying device comprising two running rails (8, 9), which extend parallel to one another and are located at a spacing from one another and are inclined in the direction of travel (7), said running rails (8, 9) having upward-facing surfaces which form a sliding and supporting surface (10) for a lower surface (5) of the collars (3) of the cylindrical members (1), and a guide rail (11) being fixedly located above and at a spacing from the sliding and supporting surfaces (10) of the two running rails (8, 9), said guide rail (11) forming a height guide for the head (2) of the cylindrical members (1), wherein at least one movable intermediate element (12, 12') is guided in said guide rail (11), said intermediate element (12, 12') is movable approximately at right angles in relation to the sliding and supporting surfaces (10) of the running rails (8, 9), and a part-region (13) of said intermediate element (12, 12') protrudes into the intermediate space between the sliding and supporting surfaces (10) of the running rails (8, 9) and the guide rail (11), and forms a guide element for the head (2) of the cylindrical members (1), wherein an element of force having a force component (14), which is directed toward the intermediate space, acts on the intermediate element (12, 12'), and wherein at least one guide in (23) is located on the guide rail (11), and at least one guide bore (24) or one guide groove (25) is located on each intermediate element (12, 12'), said guide in (23) and guide bore (24) or guide groove (25) interacting and positioning the intermediate element (12, 12') in the direction of travel (7).

2. The conveying device as claimed in claim 1, wherein the element of force which generates the force component (14) is gravity and/or a spring element (16).

3. The conveying device as claimed in claim 1, wherein the spacing between the sliding and supporting surfaces (10) of the running rails (8, 9) and a sliding surface (17) on the intermediate element (12, 12'), said sliding surface being directed toward the running rails (8, 9), is at least 0.1 mm larger than the height (22) of the head (2) of the cylindrical members (1) between the lower surface (5) of the collar (3) and an upper end surface (18) of the head (2).

4. The conveying device as claimed in claim 1, wherein, in an initial position of the intermediate element (12, 12'), the free spacing (20) between the sliding and supporting surfaces (10) of the running rails (8, 9) and the guide rail (11) is 1 mm larger than the spacing between the sliding and supporting surfaces (10) and a sliding surface (17) on the intermediate element (12, 12'), said sliding surface being directed toward the running rails (8, 9).

5. The conveying device as claimed in claim 1, wherein one or more intermediate element(s) (12, 12') extends or extend over the entire length of the guide rail (11).

6. The conveying device as claimed in claim 1, wherein the end surfaces (26, 27) of each intermediate element (12, 12') are located at a spacing (28) of at least 0.2 mm from adjacent elements, as seen in the direction of travel (7).

7. The conveying device as claimed in claim 1, wherein friction-reducing elements (30, 31) are located on the end surfaces (26, 27) of each intermediate element (12, 12'), as seen in the direction of travel (7).

8. The conveying device as claimed in claim 1, wherein the cross section of the guide rail (11) is C-shaped and the cross section of the intermediate element (12, 12') is T-shaped.

9. The conveying device as claimed in claim 1, wherein the cross section of the guide rail (11) is U-shaped and the cross section of the intermediate element (12, 12') is circular or rectangular.

10. The conveying device as claimed in claim 1, wherein the cylindrical members (1) are in the form of parisons.

11. A conveying device for cylindrical members (1) for hollow objects on a transporting route, the cylindrical members (1) having at least one head (2) with a collar (3), the conveying device comprising two running rails (8, 9), which extend parallel to one another and are located at a spacing from one another and are inclined in the direction of travel (7), said running rails (8, 9) having upward-facing surfaces which form a sliding and supporting surface (10) for a lower surface (5) of the collars (3) of the cylindrical members (1), and a guide rail (11) being fixedly located above and at a spacing from the sliding and supporting surfaces (10) of the two running rails (8, 9), said guide rail (11) forming a height guide for the head (2) of the cylindrical members (1), wherein at least one movable intermediate element (12, 12') is guided in said guide rail (11), said intermediate element (12, 12') is movable approximately at right angles in relation to the sliding and supporting surfaces (10) of the running rails (8, 9), and a part-region (13) of said intermediate element (12, 12') protrudes into the intermediate space between the sliding and supporting surfaces (10) of the running rails (8, 9) and the guide rail (11), and forms a guide element for the head (2) of the cylindrical members (1), wherein an element of force having a force component (14), which is directed toward the intermediate space, acts on the intermediate element (12, 12), and wherein the guide rail (11) comprises a C-shaped cross-section and the intermediate element (12, 12') comprises a T-shaped cross-section, the open side of the C-shaped guide rail (11) facing the heads (2) of the cylindrical members (1) and serving as a stop element for an upper, wide part of the T-shaped intermediate element (12, 12') in a downward direction.

\* \* \* \* \*